United States Patent
Matsubara et al.

(10) Patent No.: US 11,831,262 B2
(45) Date of Patent: Nov. 28, 2023

(54) MOTOR CONTROL DEVICE

(71) Applicant: Hitachi Industrial Equipment Systems Co., Ltd., Tokyo (JP)

(72) Inventors: Mitsuru Matsubara, Tokyo (JP); Kazuaki Tobari, Tokyo (JP); Yuuri Takano, Tokyo (JP); Yusuke Uei, Tokyo (JP); Tetsuo Yanada, Tokyo (JP); Hironori Ohashi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 17/792,598

(22) PCT Filed: Dec. 4, 2020

(86) PCT No.: PCT/JP2020/045288
§ 371 (c)(1),
(2) Date: Jul. 13, 2022

(87) PCT Pub. No.: WO2021/157178
PCT Pub. Date: Aug. 12, 2021

(65) Prior Publication Data
US 2023/0066812 A1   Mar. 2, 2023

(30) Foreign Application Priority Data

Feb. 4, 2020 (JP) .................. 2020-016818

(51) Int. Cl.
*G05B 5/00* (2006.01)
*H02P 23/04* (2006.01)
*H02P 23/14* (2006.01)
(52) U.S. Cl.
CPC .............. *H02P 23/04* (2013.01); *H02P 23/14* (2013.01)

(58) Field of Classification Search
CPC ............ H02P 23/04; H02P 21/05; H02P 6/16
See application file for complete search history.

(56) References Cited

U.S. PATENT DOCUMENTS

2003/0184251 A1* 10/2003 Oyama ................... H02P 29/00
318/607
2004/0113579 A1* 6/2004 Zhang .................. G05B 13/021
318/611

(Continued)

FOREIGN PATENT DOCUMENTS

JP        2005-168225 A      6/2005
JP        2008118740 A   *   5/2008

(Continued)

OTHER PUBLICATIONS

International Search Report (PCT/ISA/210) issued in PCT Application No. PCT/JP2020/045288 dated Feb. 2, 2021 with English translation (five (5) pages).

(Continued)

*Primary Examiner* — Karen Masih
(74) *Attorney, Agent, or Firm* — Crowell & Moring LLP

(57) ABSTRACT

This motor control device receives a speed command from an upper layer system control device having a position controller, the motor control device having: a position command estimator that calculates an estimate of a position command on the basis of the speed command and a motor axis position response; and a speed command generator that generates an actual speed command on the basis of the estimate so that an end section of a machine connected to the motor does not oscillate, wherein the actual speed command is output from the speed command generator to a speed controller.

12 Claims, 16 Drawing Sheets

(56) References Cited

U.S. PATENT DOCUMENTS

| | | |
|---|---|---|
| 2018/0067086 A1 | 3/2018 | Tian et al. |
| 2020/0173814 A1 | 6/2020 | Kinugasa |
| 2020/0180149 A1 | 6/2020 | Tsuboi |

FOREIGN PATENT DOCUMENTS

| | | |
|---|---|---|
| JP | 2018-196266 A | 12/2018 |
| JP | 2019-133494 A | 8/2019 |
| WO | WO 2019/031218 A1 | 2/2019 |

OTHER PUBLICATIONS

Japanese-language Written Opinion (PCT/ISA/237) issued in PCT Application No. PCT/JP2020/045288 dated Feb. 2, 2021 with partial English translation (13 pages).

* cited by examiner

F I G. 3
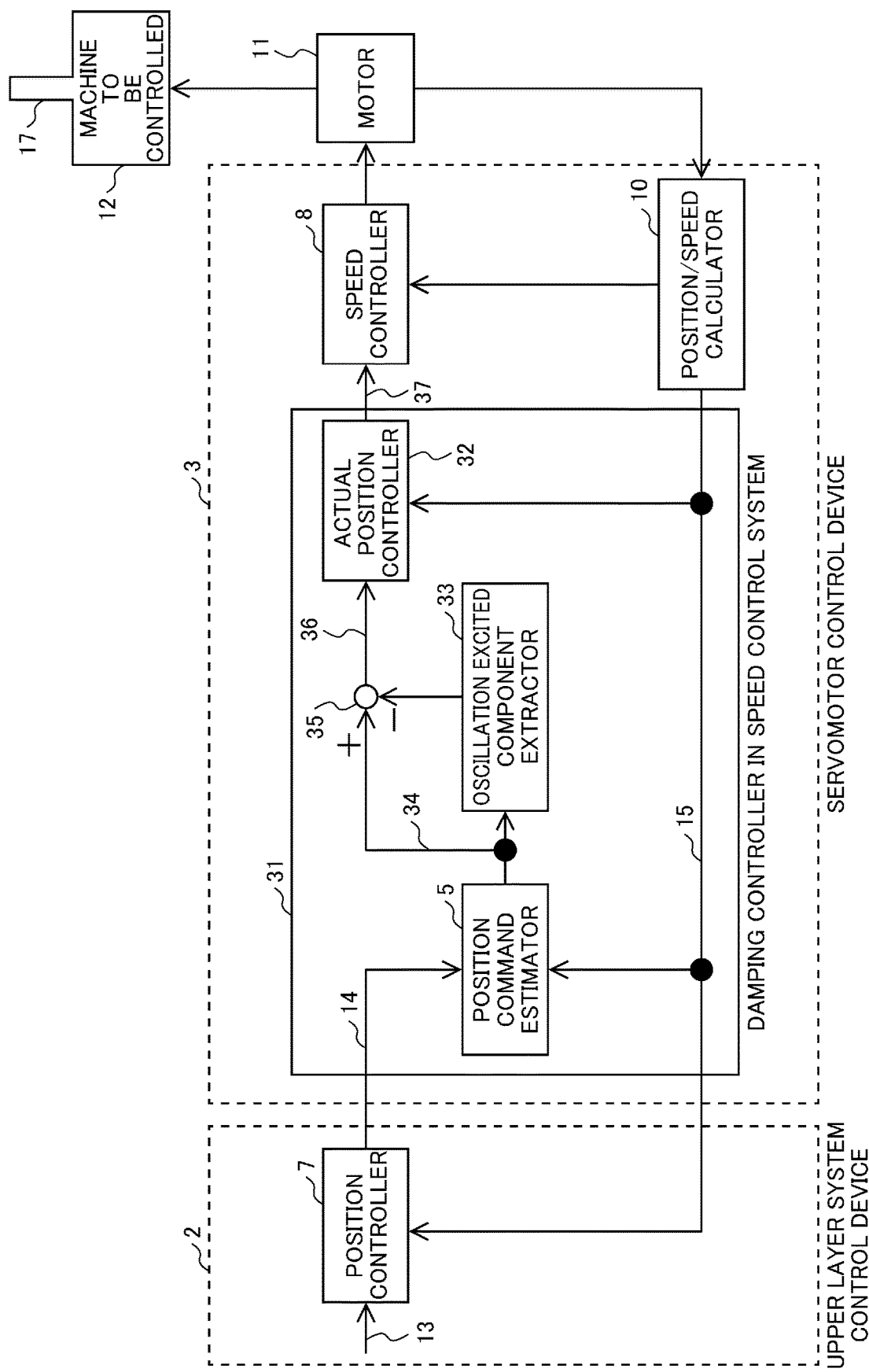

F I G. 4
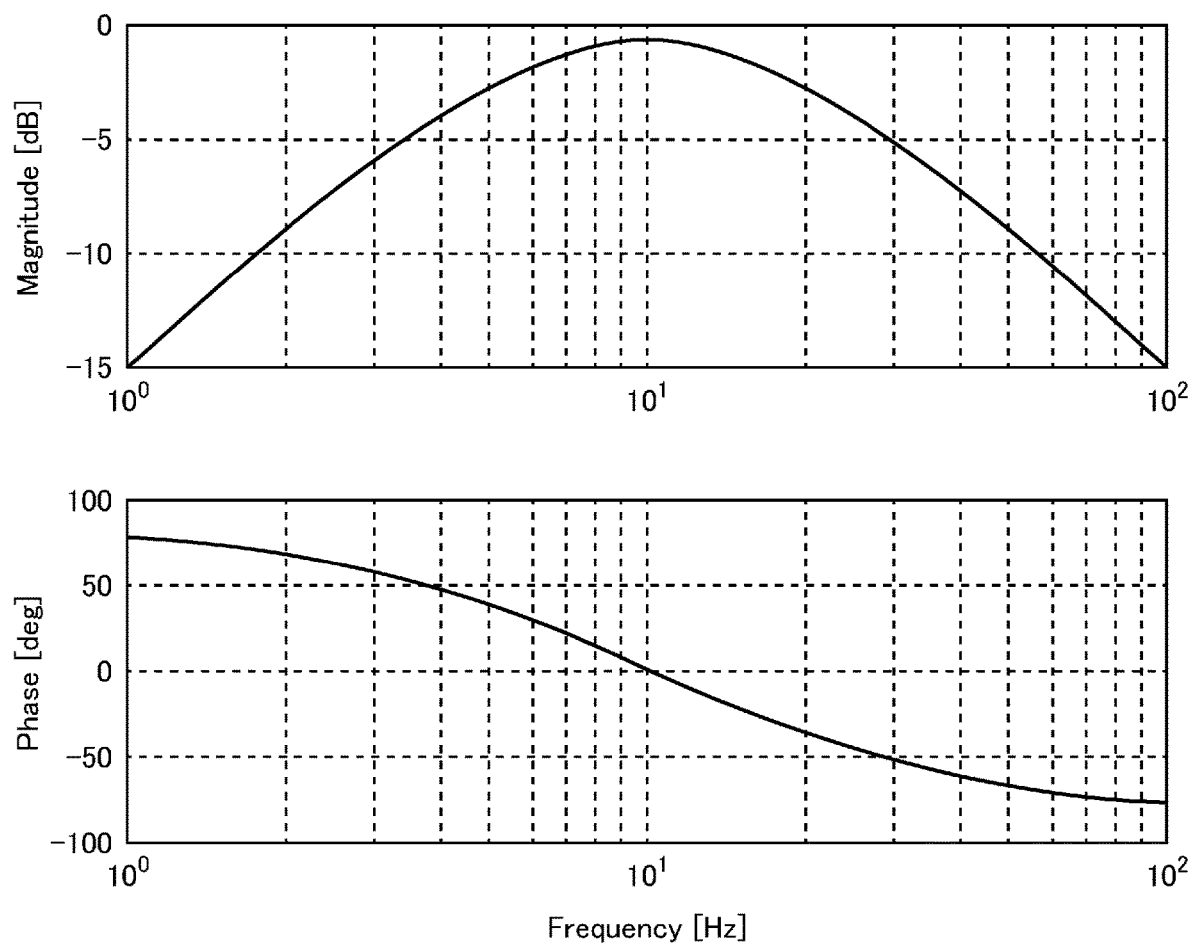

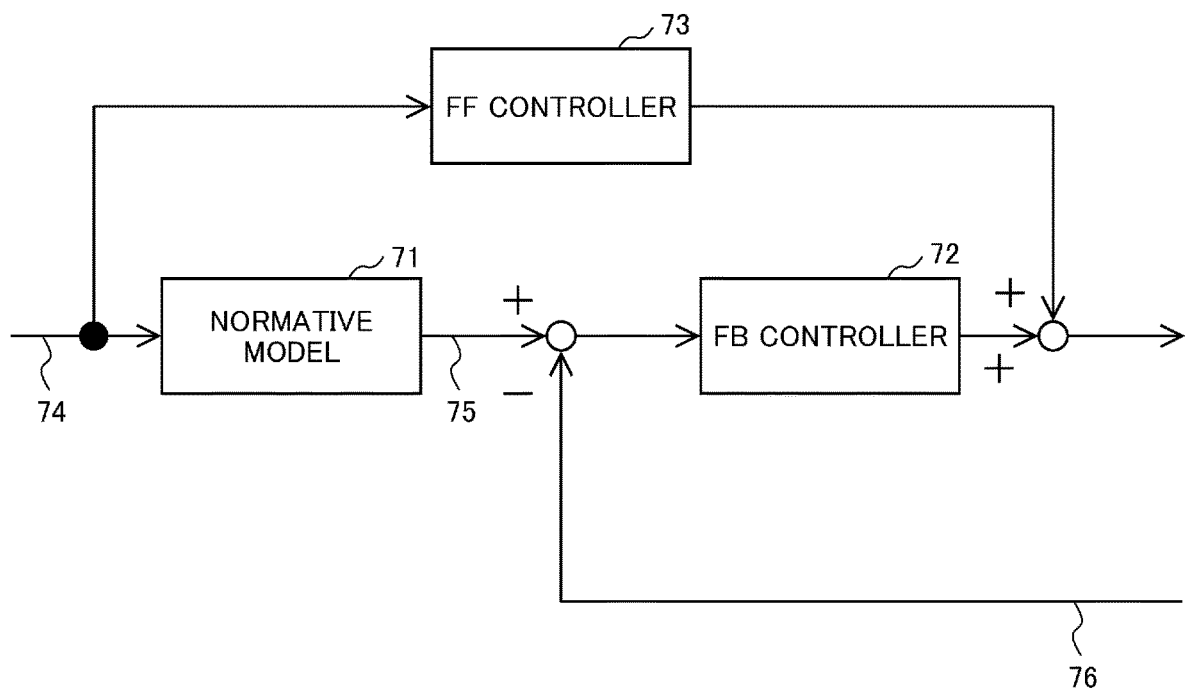
F I G. 7

F I G. 1 5
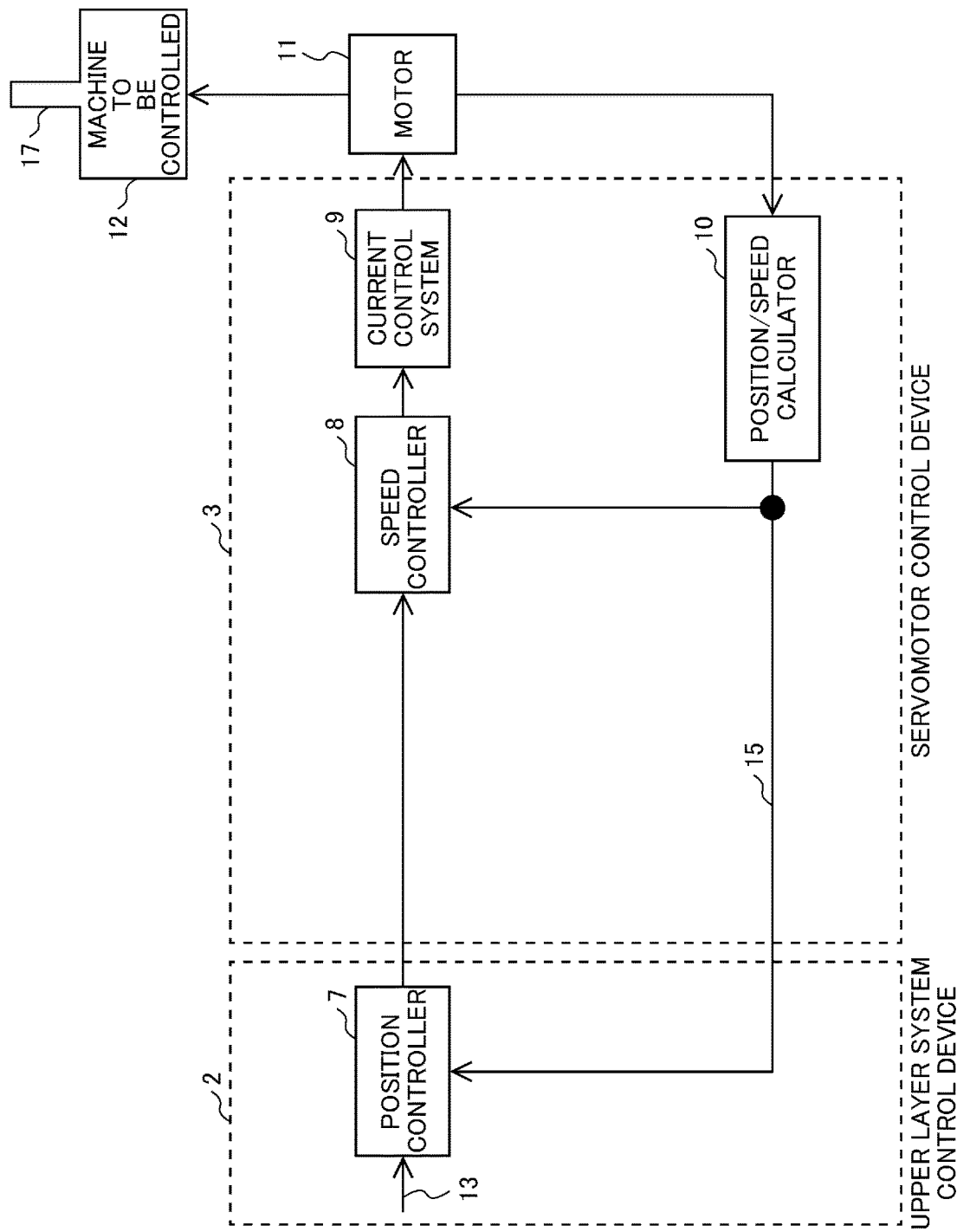

MOTOR CONTROL DEVICE

TECHNICAL FIELD

The present invention relates to a control device of a motor.

BACKGROUND ART

In a motor control system having a semi-closed configuration for the purpose of controlling a machine to be controlled, when the rigidity of the machine attached to a motor is low, in general, due to resonance/antiresonance characteristics of the machine, an end section of the machine may oscillate, and desired response characteristics may not be realized.

In an FA field, it is desired to improve a response of the control system in order to improve a tact time.

In the motor control system having the semi-closed configuration, however, when the rigidity of the machine is low, it is difficult to improve the response of the control system since the end section of the machine oscillates at a low frequency of several Hz to 100 Hz and it takes time for positioning.

In such a case, damping control is generally used. When the motor control system is a position control system, damping control is generally performed by processing a position command.

Specifically, by applying a low-pass filter or notch filter to the position command and removing a frequency component that excites oscillation of the end section of the machine from the position command, damping at the end section of the machine is realized.

Patent Document 1 makes it possible to suppress oscillation of an end section of a machine even when resonance/antiresonance characteristics of the machine change by switching between two damping filters for a position command, and a notch filter is given as an example of a damping filter.

CITATION LIST

Patent Document

Patent Document 1: JP 2005-168225 A

SUMMARY OF THE INVENTION

Problems to be Solved by the Invention

In a motor control system having a semi-closed configuration in an FA field, as illustrated in FIG. 15, for industrial reasons such as equipment replacement, a device configuration may be adopted so that an upper layer system control device that generates a position command has a position controller, and a servomotor control device is responsible for a speed control system, which is a minor loop.

Furthermore, due to reasons such as maintainability and specifications of each device, damping control cannot be realized by the position controller, and it is desired to realize damping control within the servomotor control device responsible for the speed control system, which is the minor loop, in some cases.

In Patent Document 1, a damping filter 3, a filter switching means 9, and a command direction detecting means 4 contributing to damping control are configured to realize damping control by an upper layer system control device of FIG. 15. Therefore, in Patent Document 1, damping control is not realized in the servomotor control device responsible for the speed control system.

An object of the invention is to provide a motor control device that realizes damping control in a motor servo control device responsible for a speed control system, without processing a position command for the purpose of damping at an end section of a machine in an upper layer system control device.

Solutions to Problems

A preferred example of the invention is a motor control device for receiving a speed command from an upper layer system control device having a position controller, the motor control device including a position command estimator that calculates an estimate of a position command based on the speed command and a motor axis position response, and a speed command generator that generates an actual speed command based on the estimate so that an end section of a machine connected to a motor does not oscillate, in which the actual speed command is output from the speed command generator to a speed controller.

Effects of the Invention

According to the invention, it is possible to realize damping control in a motor servo control device responsible for a speed control system, without processing a position command for the purpose of damping at an end section of a machine in an upper layer system control device.

BRIEF DESCRIPTION OF THE DRAWINGS

FIG. 3 is a diagram illustrating a specific configuration of FIG. 1.

FIG. 4 is a diagram illustrating frequency characteristics of an oscillation excited component extractor.

FIG. 7 is a diagram illustrating a specific configuration of the FF controller of FIG. 6.

FIG. 15 is a diagram illustrating a configuration including an upper layer system control device and a servomotor control device.

MODE FOR CARRYING OUT THE INVENTION

First, a description will be given of a comparative example of a device configuration, in which an upper layer system control device that generates a position command has a position controller, and a servomotor control device is responsible for a speed control system that is a minor loop, to be realized in the invention.

Figure 16:
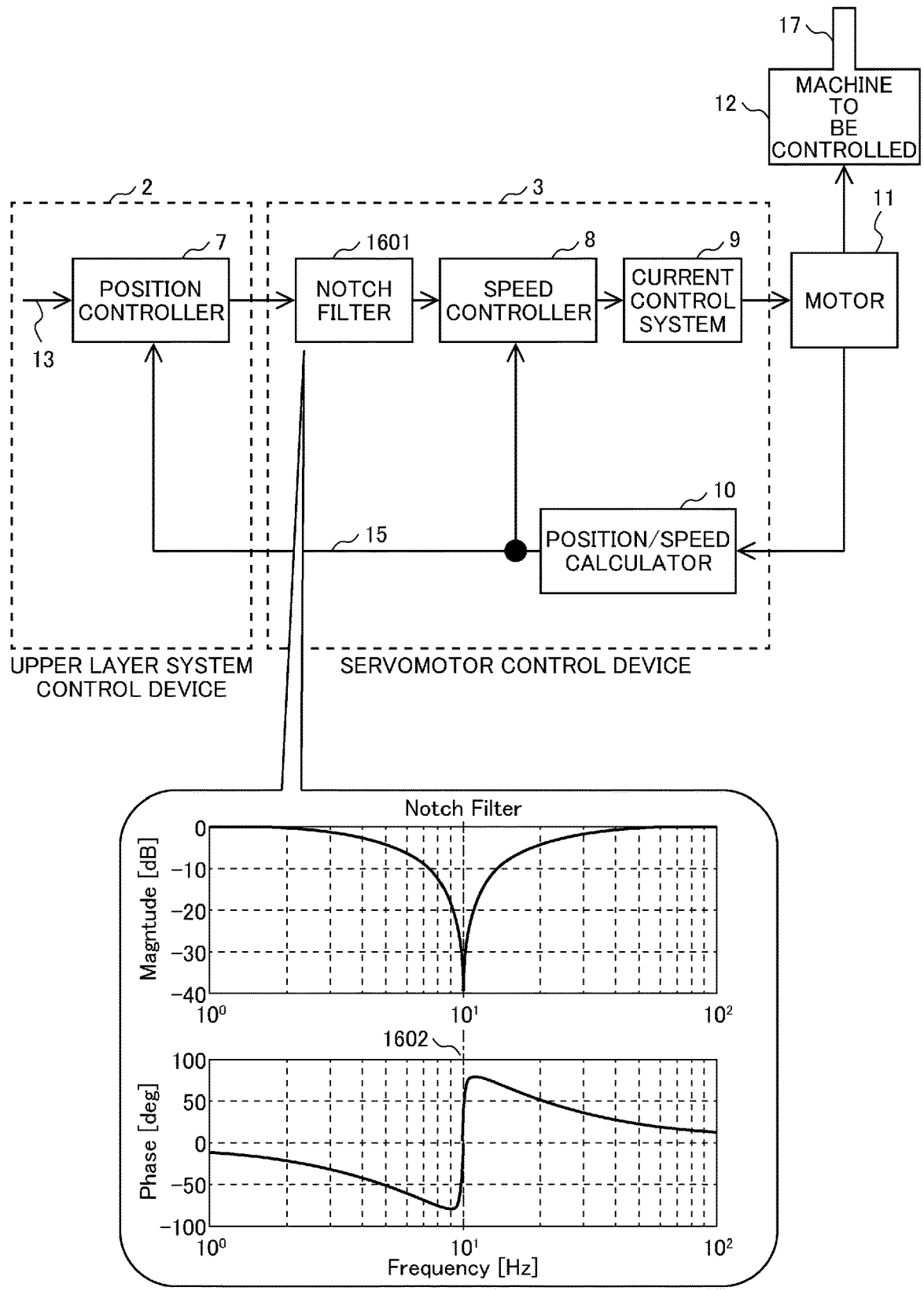
FIG. 16 is a diagram illustrating damping control in a speed control system for a comparative example.

FIG. 16 is a diagram illustrating a comparative example. As illustrated in FIG. 16, by interposing a notch filter 1601 in a speed control system, it is possible to remove a frequency component that excites oscillation of a mechanical end from a speed command. Note that a notch frequency 1602 of the notch filter 1601 is set so as to match a frequency of the oscillation of the mechanical end.

In the case of the comparative example, the phase lag characteristic around the notch frequency of the notch filter 1601 reduces a stability margin of a position control system, and a response at the mechanical end oscillates at a frequency different from resonance/antiresonance characteristics of a machine. This phenomenon becomes unavoidable as the resonance/antiresonance characteristics of the machine are in a low frequency range and as the gain of the position controller is increased with the aim of improving a tact time.

That is, in the case of performing damping control in the servomotor control device responsible for the speed control system in a motor control system having a semi-closed configuration, in the comparative example, there is a problem that it is difficult to suppress oscillation of the mechanical end in a low frequency range of several Hz to 100 Hz.

Hereinafter, embodiments will be described with reference to the drawings. Note that in each figure, the same numbers are assigned to components having a common function, and a description thereof will be omitted. Further, hereinafter, "feedback" may be abbreviated as "FB", and "feedforward" may be abbreviated as "FF".

First Embodiment

Figure 1:
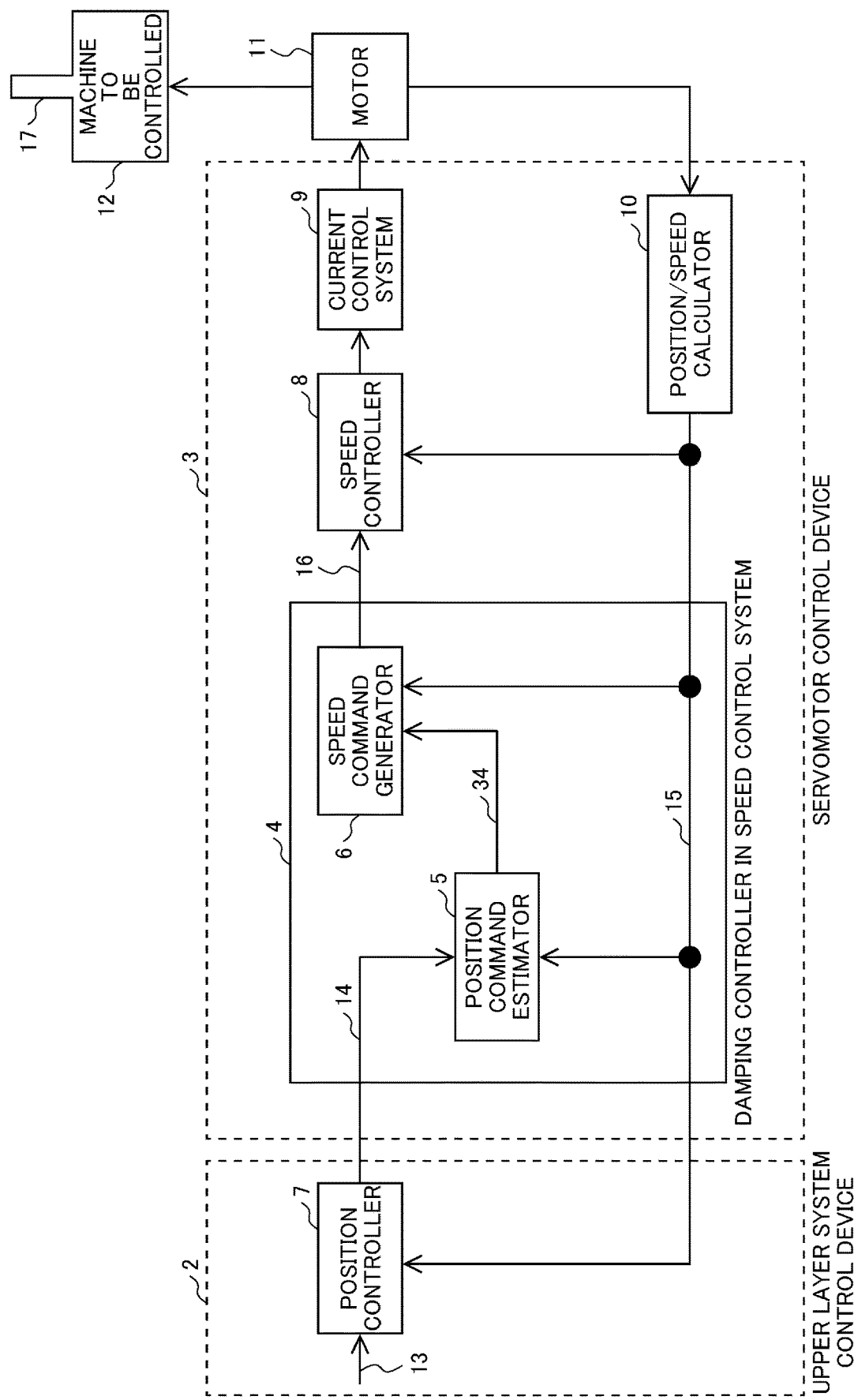
FIG. 1 is a diagram illustrating a first basic configuration of a first embodiment.
Figure 2:
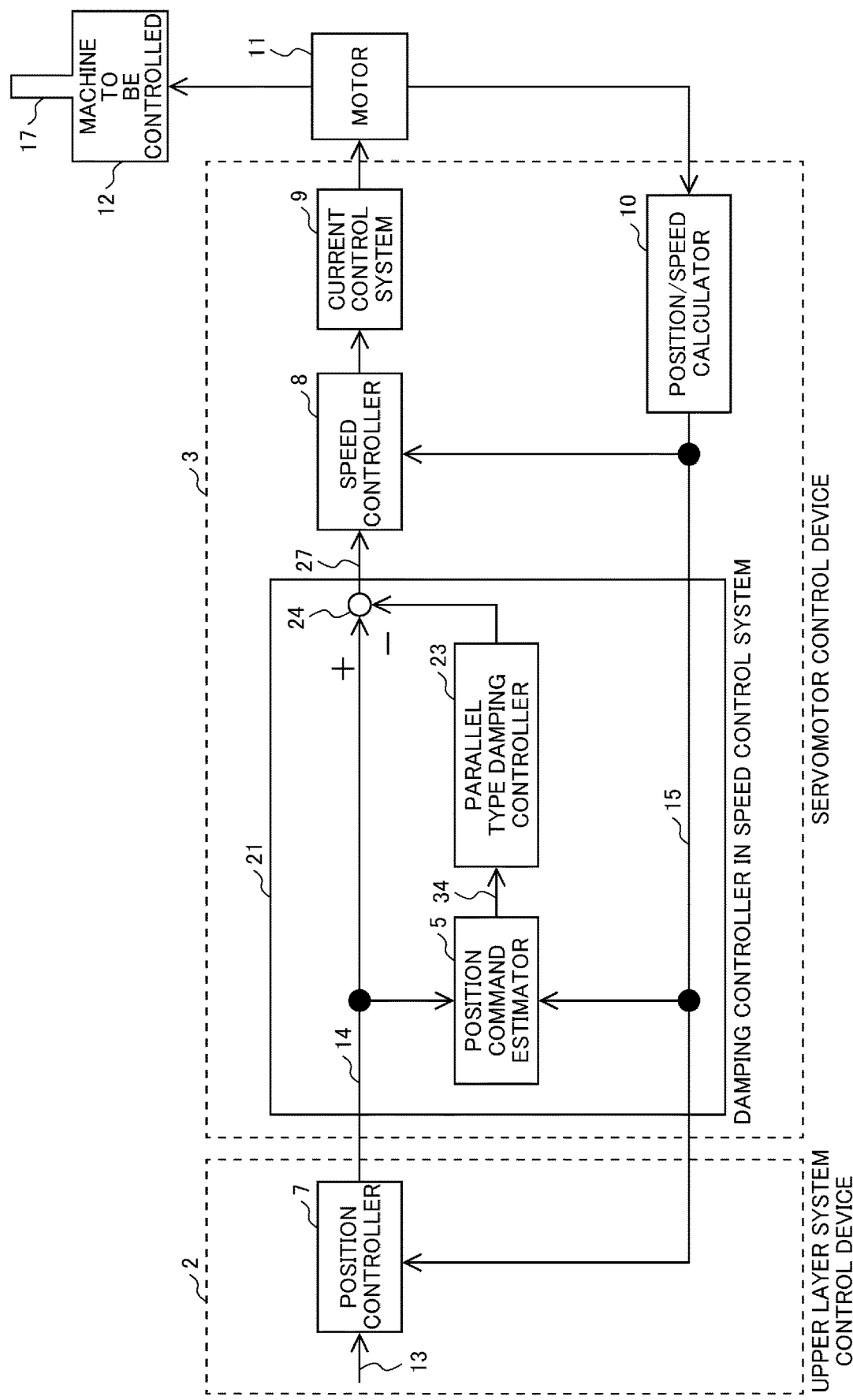
FIG. 2 is a diagram illustrating a second basic configuration of the first embodiment.

FIGS. 1 and 2 are diagrams illustrating a cascade feedback type motor control system having a semi-closed configuration including a damping controller 4 in a speed control system and a damping controller 21 in the speed control system of the first embodiment.

A servomotor control device 3 illustrated in FIGS. 1 and 2 is incorporated in a position control system so as to receive a speed command from an upper layer system control device 2 and output a motor axis position response 15 to the upper layer system control device 2. The upper layer system control device 2 is incorporated in the position control system, has a position controller 7, generates a position command, and generates a speed command using the position controller 7 from the position command and the motor axis position response 15 received from the servomotor control device 3. The position controller inputs a position command 13 and the motor axis position response 15 and outputs a position operation amount (speed command 14).

The servomotor control device 3 of FIG. 1 is responsible for a speed control system of a motor, includes a speed controller 8, includes the damping controller 4 in the speed control system having a position command estimator 5 that calculates an estimate 34 of a position command based on the speed command 14 and the motor axis position response 15, and a speed command generator 6 that generates an actual speed command 16 based on the estimate 34 of the position command so that an end section 17 of a machine does not oscillate, and uses the actual speed command 16 as a command of the speed controller 8. The speed controller 8 inputs the actual speed command 16 and the motor axis speed response 15, and outputs a speed operation amount as a current command to a current control system 9.

Note that for convenience of description below, output of a position/speed calculator 10 may refer to the motor axis position response 15 or refer to the motor axis speed response 15.

The servomotor control device 3 of FIG. 2 is responsible for a speed control system of a motor, includes a speed controller 8, and includes a damping controller 21 in the speed control system having the position command estimator 5 that calculates the estimate 34 of the position command based on the speed command 14 and the motor axis position response 15, a parallel type damping controller 23 that extracts a frequency component for exciting oscillation of the end section 17 of the machine included in the speed command based on the estimate 34 of the position command and outputs the extracted frequency component, and an adder/subtractor 24, and the adder/subtractor 24 subtracts the output of the parallel type damping controller 23 from the speed command 14, removes a frequency component for exciting oscillation of the end section 17 of the machine from the speed command 14, sets an output of the adder/subtractor 24 as an actual speed command 27 to use the output as an output of the damping controller 21 in the speed control system, and uses the actual speed command 27 as a command of the speed controller 8.

When the rigidity of the machine attached to a motor shaft is low, for example, if the control gains of the position controller 7 and the speed controller 8 are increased for the purpose of shortening a positioning time, the end section of the machine connected to the motor (hereinafter referred to as a mechanical end) 17 oscillates at a low frequency of several Hz to 100 Hz, and conversely, it takes time for positioning, and it may be difficult to increase the response. At this time, by applying damping control, it is generally possible to suppress oscillation of the mechanical end 17 and shorten the positioning time.

As illustrated in FIGS. 1 and 2, the present embodiment assumes the case where the motor control system includes the upper layer system control device 2 and the servomotor control device 3.

The upper layer system control device 2 generates the position command 13, includes the position controller 7, receives a motor axis position response (response indicating a position of a rotor of the motor) 15 from the servomotor control device 3, generates the speed command 14 by the position controller 7 based on the position command 13 and the motor axis position response 15, and outputs the generated speed command 14 to the servomotor control device 3.

Note that the position command 13 may be given from the outside of the upper layer system control device 2 from another upper layer device, etc.

The servomotor control device 3 includes the speed controller 8, the current control system 9, the position/speed calculator 10, and the damping controller 4 (or 21) in the speed control system, receives the speed command 14 from the upper layer system control device 2, controls a speed of the motor, calculates a position and a speed of a motor axis by the position/speed calculator 10 based on a measurement signal from a sensor (for example, a rotary encoder), which can detect the position/speed, attached to the motor, uses the position and the speed as the motor axis position response 15 and the motor axis speed response 15, and outputs the motor axis position response 15 to the upper layer system control device 2.

Although not illustrated, the servomotor control device 3 has a CPU (Central Processing Unit). With regard to the damping controller 21 in the speed control system including respective processing units such as the position command estimator 5, the speed command generator 6, and the parallel type damping controller, the speed controller 8, the position/speed calculator 10, etc., processing of each of the processing units is executed by the CPU reading a program and executing the program. Hardware such as an ASIC (Application Specific Integrated Circuit) or an FPGA (Field Programmable Gate Array) may be included in all or some of the respective processing units. Further, the upper layer system control device 2 has a CPU, and the CPU executes a program corresponding to the position controller 7.

Damping control is performed by causing a low-pass filter or a notch filter to act on the position command 13 and removing a frequency component that excites oscillation of the mechanical end 17 from the position command 13.

However, due to equipment replacement, maintainability, specifications of each device, etc., damping control cannot be realized by the position controller 7, and damping control is desired to be realized in the servomotor control device 3 responsible for the speed control system, which is a minor loop.

In the first embodiment, it is a problem that the position controller 7 of the upper layer system control device 2 does not have damping control, and damping control is realized in the servomotor control device 3. In the present embodiment, the damping controller 4 (or 21) in the speed control system is a damping controller for solving the problem.

Ford forward type damping control is performed by removing a frequency component that excites oscillation of the mechanical end from the position command 13.

For implementation thereof in the speed control system, in principle, the following steps may be performed.

S1: Detect and presume position command.

S2: Extract a frequency component that excites oscillation of the mechanical end from the detected and presumed position command.

S3: Generate a speed command not including the extracted frequency component and use the speed command as a speed command of the speed controller.

FIG. 3 is a diagram illustrating a configuration example of the damping controller 4 in the speed control system corresponding to FIG. 1.

A damping controller 31 in the speed control system includes an oscillation excited component extractor 33 that extracts a frequency component for exciting oscillation of the mechanical end, the position command estimator 5 that estimates the position command 13, an actual position controller 32, and an adder/subtractor 35.

Note that for the sake of simplicity, it is assumed that the position command estimator 5 may correctly estimate the position command 13.

The actual position controller 32 generates a speed command 37 (implement S3) based on the motor axis position response 15 and a position command 36 not including a frequency component for exciting oscillation of the mechanical end obtained by dividing a position command estimate 34 (implement S1) calculated by the position command estimator 5 by an output (implement S2) of the oscillation excited component extractor 33 using the adder/subtractor 35.

As a result, the damping controller 31 in the speed control system illustrated in FIG. 3 may implement the above S1 to S3 and suppress oscillation of the mechanical end.

Note that the oscillation excited component extractor 33 is a filter capable of extracting the frequency component that excites oscillation of the mechanical end from the position command estimate 34 without phase lag, and an example thereof is the following equation corresponding to a line enhancer (LE).

[Equation 1]

$$LE = \frac{2WL\omega_n \cdot s}{s^2 + 2W\omega_n \cdot s + \omega_n^2} \quad (1)$$

However, W is a parameter responsible for an extraction width, L is a parameter responsible for an extraction power level, and ωn is an extraction frequency [rad/s]. FIG. 4 illustrates frequency characteristics of Equation (1) when W=1, L=0.1, and ωn=2π×10. It is a characteristic that the amplitude reaches a peak at the frequency ωn and the phase lag becomes zero.

In the damping controller 31 in the speed control system, the actual position controller 32 performs position control, and the position controller 7 included in the upper layer system control device 2 is essentially not responsible for position control. Therefore, the control gain of the position controller 7 and the control gain of the actual position controller 32 do not have to be the same.

Further, the actual position controller 32 may be a controller having a configuration different from that of the position controller 7. For example, the position controller 7 is a PID controller, and the actual position controller 32 is a P controller.

It should be noted that while the damping controller 31 in the speed control system has a degree of freedom in designing the actual position controller 32, the separate actual position controller 32 is required in addition to the position controller 7.

Figure 5:
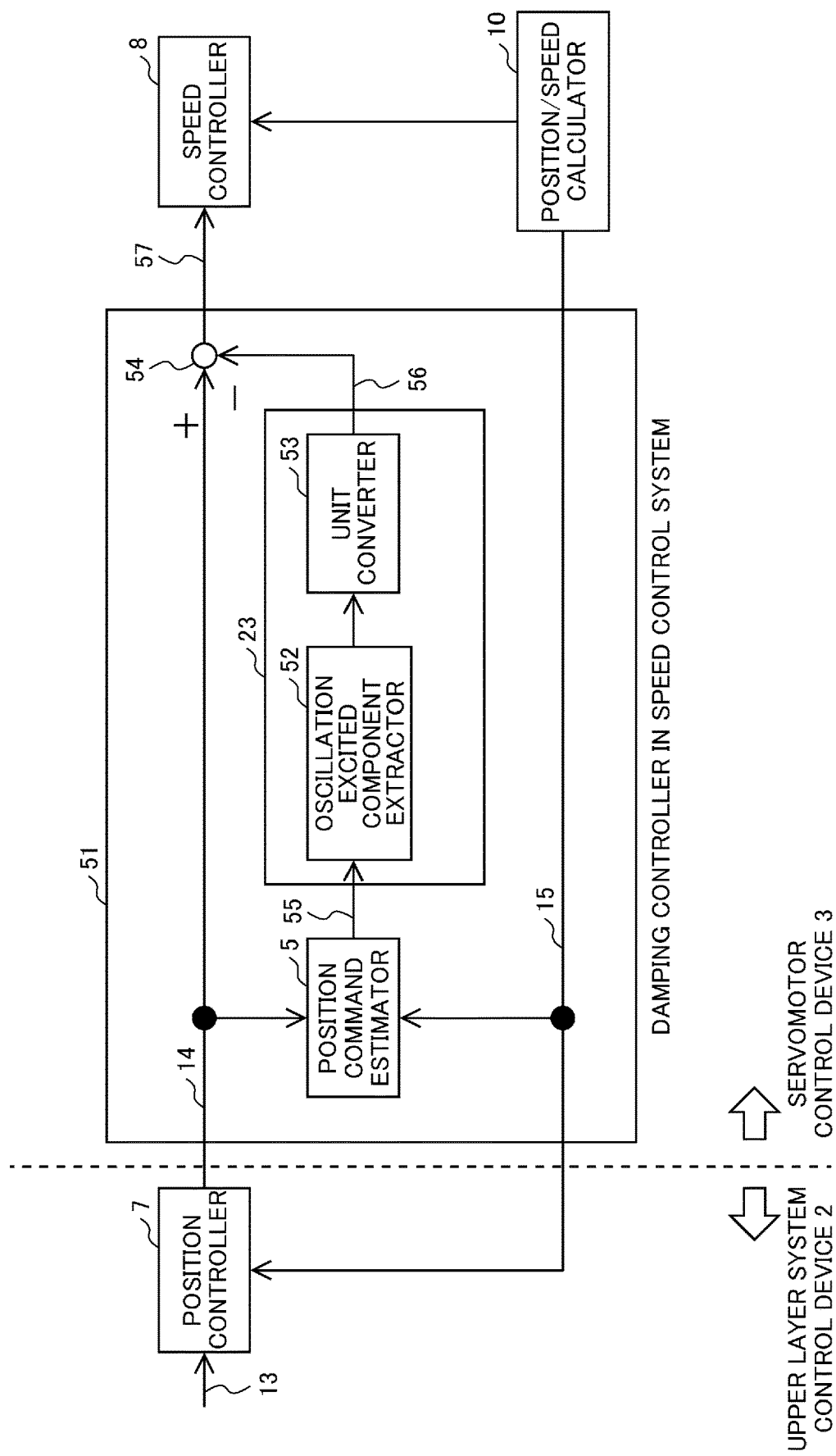
FIG. 5 is a diagram illustrating a configuration of FF type damping control corresponding to FIG. 2.

FIG. 5 is a diagram illustrating a configuration of FF type damping control corresponding to FIG. 2.

A damping controller 51 in a speed control system of FIG. 5 includes an oscillation excited component extractor 52 that extracts a frequency component for exciting oscillation of the mechanical end, a position command estimator 5 that estimates the position command 13, a unit converter 53, and an adder/subtractor 54.

Note that for the sake of simplicity of description, it is assumed that the position command estimator 5 may correctly estimate the position command 13.

The damping controller 51 in the speed control system extracts a frequency component for exciting oscillation of the mechanical end (corresponding to S2) using the oscillation excited component extractor 52 without phase lag based on a position command estimate 55 calculated by the position command estimator 5 (corresponding to S1), converts a signal obtained from the oscillation excited component extractor 52 into a unit of speed using the unit converter 53, and sets a signal obtained by removing an output 56 of the unit converter 53 from the speed command 14 using the adder/subtractor 54 as a speed command of the speed controller 8 to use the signal as an actual speed command 57 (corresponding to S3).

As a result, the damping controller 51 in the speed control system illustrated FIG. 5 may implement the above-mentioned S1 to S3 and may suppress oscillation of the mechanical end.

An example of the oscillation excited component extractor 52 is the LE illustrated in Equation (1). An example of the unit converter 53 is the position controller 7 included in the upper layer system control device 2.

The position controller 7 performs a function of generating a speed command based on the position command 13 and a deviation between the position command 13 and the motor axis position response 15. Therefore, in the damping controller 51 in the speed control system, the position controller 7 may function as the unit converter 53.

An example of the position command estimator 5 is the following equation.

[Equation 2]

$$r_e = F_p \cdot s_r + y_p \quad (2)$$

However, re indicates the position command estimate 55, sr indicates the speed command 14, and yp indicates the motor axis position response 15. Fp is an estimation filter that matches the inverse characteristics of the position controller 7. For example, when the position controller 7 is a P controller, Fp is the inverse characteristics of the P controller, that is, the reciprocal of the P gain.

The damping controller 51 in the speed control system illustrated FIG. 5 is not FB type damping control based on a motor end position response, but FF type damping control that processes a command in an FF manner, and performs a function of applying a notch filter to the position command 13 to perform damping control.

Figure 6:
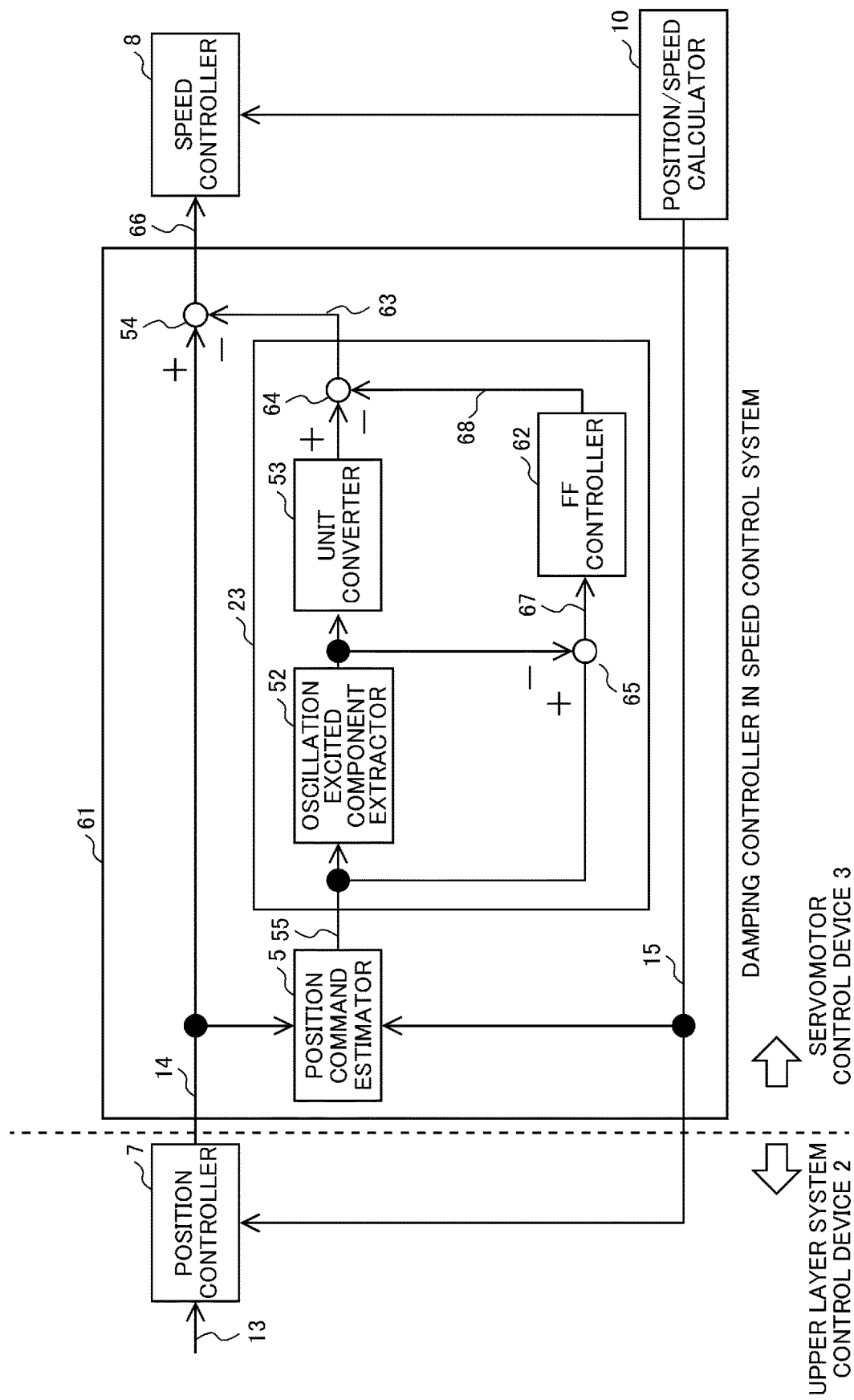
FIG. 6 is a diagram illustrating a configuration including an FF controller corresponding to FIG. 2.

Therefore, as in the case of performing damping control using the notch filter, the actual speed command 57 tends to be delayed in rising as compared with the speed command 14, and the motor axis position response 15 is further delayed with respect to the actual speed command 57. FIG. 6 illustrates a configuration including a means for resolving such a response delay by a method other than increasing the control gain of the position controller 7.

FIG. 6 is a diagram illustrating a configuration example including an FF controller corresponding to a basic configuration illustrated FIG. 2.

The oscillation excited component extractor 52 and the unit converter 53 illustrated FIG. 6 have the same functions as those illustrated FIG. 5. When compared to FIG. 5, in a configuration of FIG. 6, an adder/subtractor 64, an adder/subtractor 65, and an FF controller 62 are added to the parallel type damping controller 23.

The parallel type damping controller 23 extracts a frequency component for exciting oscillation of the mechanical end by the oscillation excited component extractor 52 from the position command estimate 55, and outputs the extracted frequency component for exciting oscillation of the mechanical end to the adder/subtractor 65. The adder/subtractor 65 subtracts an output of the oscillation excited component extractor 52 from the position command estimate 55. A signal 67 from the adder/subtractor 65 is processed by the FF controller 62, which is a differential element having the scalar adjustment gain, and calculates an output signal 63 by subtracting an output 68 of the FF controller 62 from an output of the unit converter 53 using the adder/subtractor 64. The output signal 63 is subtracted from the speed command 14 by the adder/subtractor 54, and an output signal 66 of the adder/subtractor 54 is an output of the damping controller 61 in the speed control system and is output to the speed controller 8 as a speed command of the speed controller 8.

A control target of the position control system in motor control is ideally an integrator. Therefore, the FF controller 62 may basically be a differential element having the scalar adjustment gain.

In the configuration of FIG. 6, the signal 67 refers to a position command in which the frequency component for exciting oscillation of the mechanical end is removed from the position command estimate 55, and by using the FF controller 62 therefor, it is possible to obtain an effect of accelerating the response characteristic by FF control while accompanied by the damping effect.

Note that a configuration of the FF controller 62 has a degree of freedom, and it is possible to configure the FF controller 62 so as to have a configuration of general model matching 2 degree-of-freedom control as illustrated in FIG. 7, for example.

Note that in the general model matching 2 degree-of-freedom control illustrated in FIG. 7, an FF controller 73 is configured so that a response 76 to be controlled becomes a normative response 75 obtained by processing a command 74 by a normative model 71, and the FB controller 72 is configured to suppress a deviation between the normative response 75 and the response 76 to be controlled. In this case, the FF controller 73 may basically include the normative model 71×the inverse characteristic of a transfer function to be controlled.

According to the configuration of FIG. 6, in addition to increasing the control gain of the position controller 7, the FF controller 62 provided in the parallel type damping controller 23 may improve responsiveness.

Note that in the motor control system of FIGS. 5 and 6, there is an FB loop via the position command estimator 5 of the damping controller 21 (or 51 or 61) in the speed control system. However, it should be noted that there is no effect of suppressing the disturbance applied to a control target or suppressing oscillation of the mechanical end occurring by the disturbance applied to the control target. A reason therefor is that the parallel type damping controller 23 functions as FF type damping control.

In addition, it should be noted that, in the position command estimator 5, even when the disturbance is applied to the control target, and an influence of the disturbance is superimposed on the motor axis position response 15, unless the disturbance is applied to a processing system on the left side of the position command estimator 5 in FIGS. 5 and 6, the position command 13 may be estimated regardless of the presence or absence of the disturbance influence superimposed on the motor axis position response 15.

In practical use, communication delay between the upper layer system control device 2 and the servomotor control device 3, quantization error in each process, etc. are assumed as disturbance factors. However, when these factors are sufficiently small, no problem occurs.

As described above, the FF type damping control illustrated in FIGS. 5 and 6 cannot suppress oscillation of the mechanical end caused by the disturbance.

Figure 8:
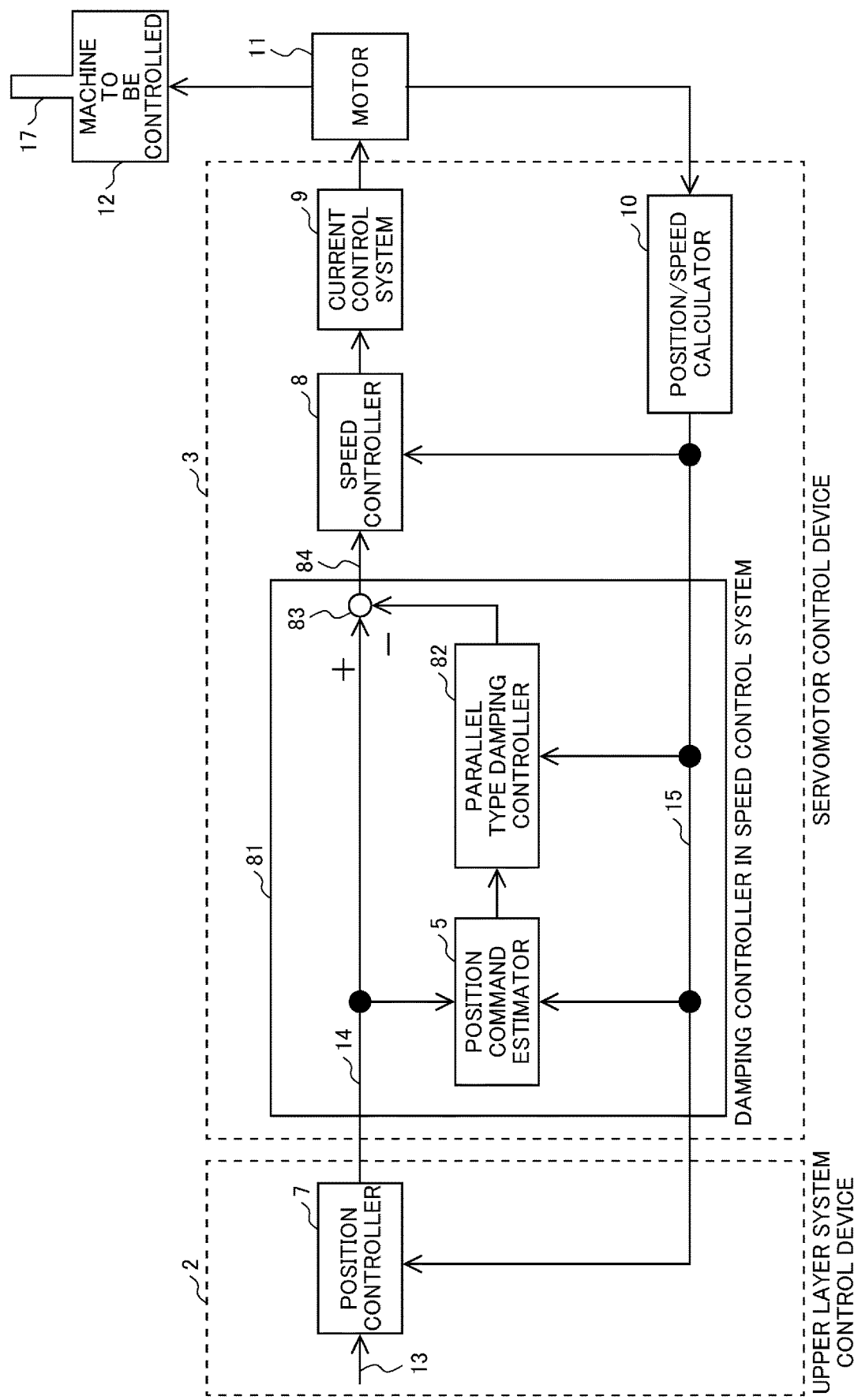
FIG. 8 is a diagram illustrating a configuration when FB type damping control is executed.

FIG. 8 is a diagram illustrating a configuration in the case of executing FB type damping control, which can suppress oscillation of the mechanical end caused by the disturbance. Specifically, a parallel type damping controller 82 detects the influence of the disturbance via motor axis position response 15, and executes the FB type damping control so as to suppress oscillation of the mechanical end caused by the disturbance.

The parallel type damping controller 82 illustrated in FIG. 8 calculates a reverse phase component of an oscillation component of the end section 17 of the machine based on the output of the position command estimator 5 and the motor axis position response 15, and uses the reverse phase component as an output of the parallel type damping controller 82. An adder/subtractor 83 of a damping controller 81 in the speed control system subtracts the reverse phase component from the speed command 14, and outputs a subtraction result to the speed controller 8 as an actual speed command 84.

Figure 9:
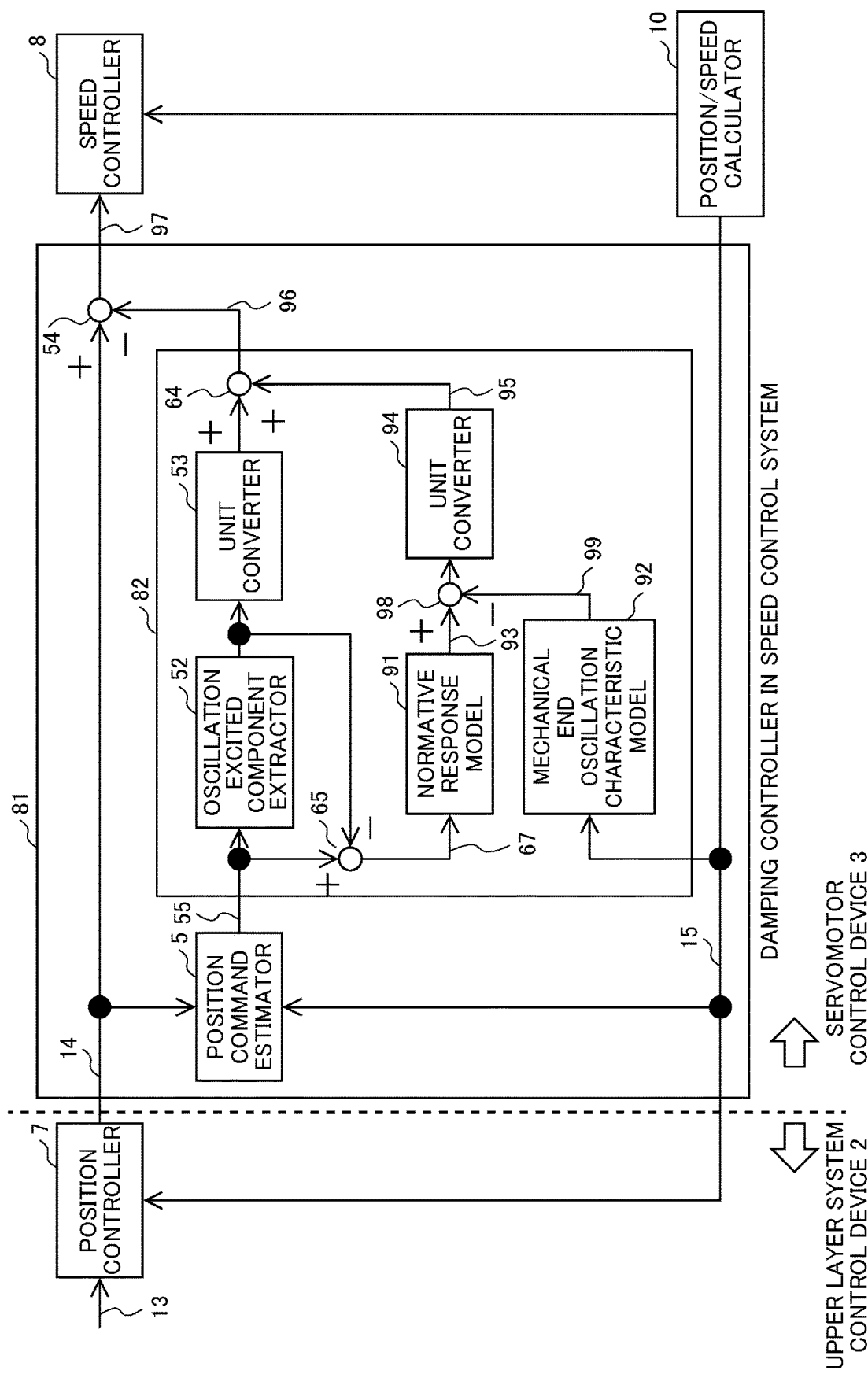
FIG. 9 is a diagram illustrating a specific configuration of a parallel type damping controller of FIG. 8.

FIG. 9 is a diagram illustrating an example of the parallel type damping controller 82 illustrated in FIG. 8. FIG. 9 has a configuration in which a normative response model 91, a mechanical end oscillation characteristic model 92, the adder/subtractor 64, the adder/subtractor 65, the adder/subtractor 98, and a unit converter 94 are added to the parallel type damping controller 23 illustrated in FIG. 5.

As illustrated in FIG. 9, the parallel type damping controller 82 includes the normative response model 91, which defines that a response of the position control system does not oscillate with respect to the position command and becomes a desired response, the mechanical end oscillation characteristic model 92, which means transmission characteristics from the motor axis to the mechanical end, the third adder/subtractor 98, and the unit converter 94 that converts the unit of an input signal into the dimension of speed, removes a signal obtained by processing the motor axis position response 15 using the mechanical end oscillation characteristic model 92 from a signal obtained by processing an output of the position command estimator 5 using the normative response model 91 by the third adder/subtractor 98, outputs a signal obtained by processing an output signal of the third adder/subtractor 98 by the unit converter 94 as a reverse phase component of an oscillation component of the mechanical end, removes a signal, from which a frequency component for exciting oscillation of the end section of the machine included in the speed command is extracted, by the sixth adder/subtractor (64 or 54), removes the reverse phase component from the speed command 14 by the sixth adder/subtractor (64 or 54), and sets an output of the sixth adder/subtractor (64 or 54) as an actual speed command 97 to use the output as an output of the damping controller 81 in the speed control system.

The FB type damping control may generally be realized by reducing the reverse phase of oscillation of the mechanical end from the speed command 14. The normative response model 91 and the mechanical end oscillation characteristic model 92 are for calculating the reverse phase of oscillation of the mechanical end.

The normative response model 91 is a model defining that a response of the position control system does not oscillate with respect to the position command and becomes a desired response, and is, for example, the following equation.

[Equation 3]
Normative Response Model $$M_m = \frac{\omega_f}{s + \omega_f} \quad (3)$$

However, ωf is a response frequency [rad/s] of the position control system.

Meanwhile, the mechanical end oscillation characteristic model 92 means the transmission characteristics from the motor axis to the mechanical end, and is the following equation when a control target machine can be regarded as a bi-inertial system.

[Equation 4]
Mechanical End Oscillation Characteristic Model $$AR = \frac{2\zeta_a \omega_a s + \omega_a^2}{s^2 + 2\zeta_a \omega_a s + \omega_a^2} \quad (4)$$

However, ωa and ζa denote an antiresonance frequency [rad/s] and an antiresonance attenuation coefficient of the bi-inertial system, respectively.

As illustrated in FIG. 9, a response of the mechanical end may be estimated by the mechanical end oscillation characteristic model 92, and an estimate of the mechanical end response may be obtained as an estimated mechanical end signal 99. Meanwhile, an ideal position control system response without oscillation of the mechanical end may be calculated as an ideal response signal 93 by the normative response model 91.

By subtracting the estimated mechanical end signal 99 from the ideal response signal 93 using the adder/subtractor 98, it is possible to extract a reverse phase component of oscillation of the mechanical end superimposed on the response of the mechanical end. Meanwhile, the unit converter 94 is operated to convert the unit into the dimension of speed, and a reverse phase component of the dimension of speed is calculated as a signal 95.

The signal 95 is added by the adder/subtractor 64, and it is possible to reduce a reverse phase of oscillation of the mechanical end 17 from the speed command 14 by the adder/subtractor 54, and to realize FB type damping control.

In the configurations of FIGS. 2, 5, 6, 8, and 9, the position command estimator 5 is based on Equation (2). However, the position command estimator may be a signal mapped by a predetermined filter with respect to an estimate of the position command.

For example, when a predetermined filter is used as a unit converter, there is an advantage that arithmetic processing can be simplified. As described above, an example of the unit converter is the position controller 7, which has the inverse characteristics of Fp. Therefore, when both sides of Equation (2) are processed using the inverse characteristics of Fp, Equation (5) is obtained.

[Equation 5]

$$r_{ep} = F_p^{-1} \cdot r_e = s_{rf} + R_p^{-1} \cdot y_p \quad (5)$$

However, rep is a signal mapped using a predetermined filter (inverse characteristics of Fp) with respect to an estimate re of the position command. An output signal 1002 of a position command estimator 1001 is rep of Equation (5).

Figure 10:
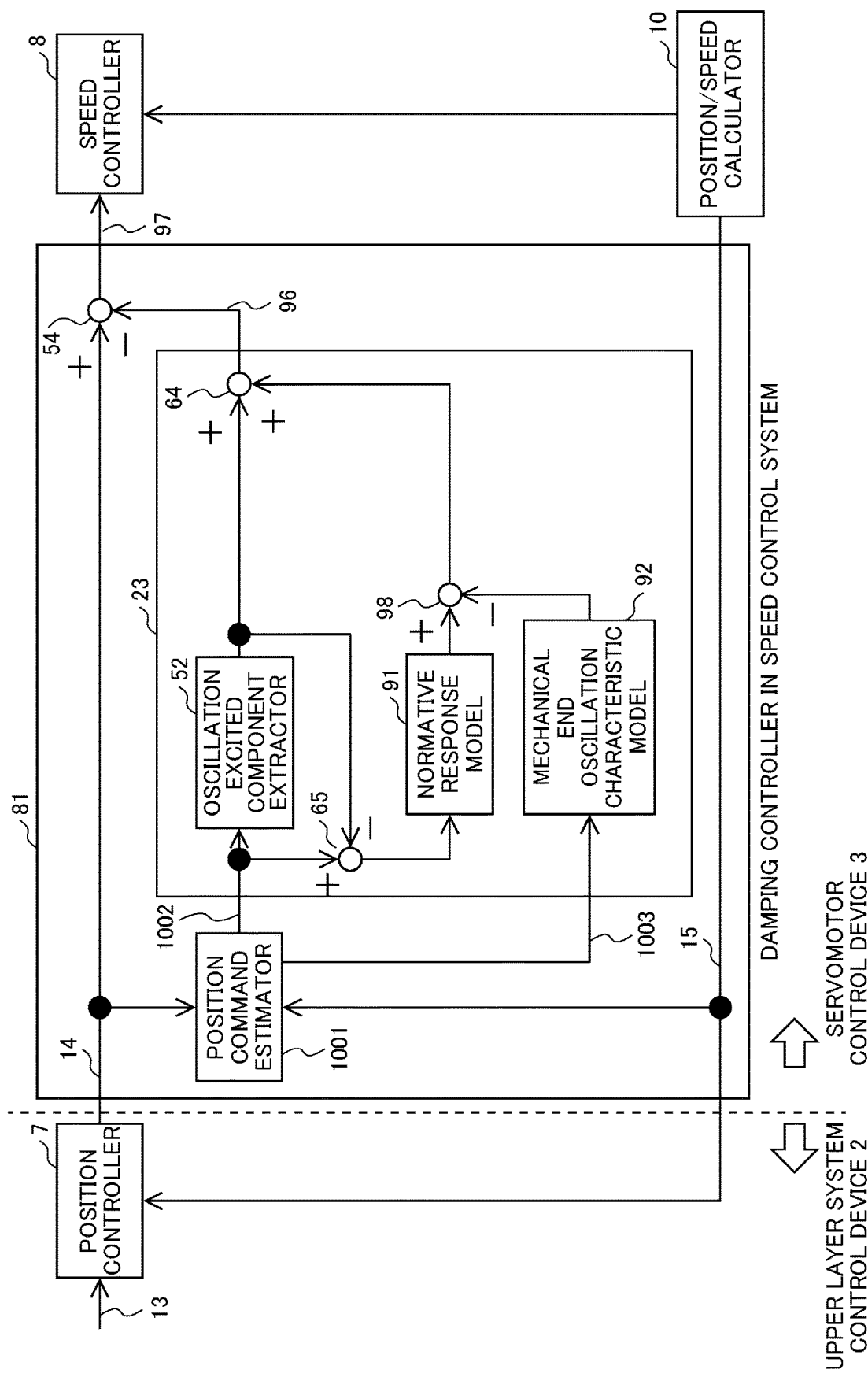
FIG. 10 is a configuration diagram when a predetermined filter is provided.

A configuration of FIG. 10 is the case where the position command estimator 1001 represented by Equation (5) is adopted for the configuration of FIG. 9.

The position command estimator 1001 sets, as an estimation target, a signal obtained by mapping a position command generated by upper layer system control device 2 using a predetermined filter, and outputs an estimate of the signal obtained by mapping the position command using the predetermined filter.

When such a position command estimator 1001 is used, it is unnecessary to have a unit converter in the parallel type damping controller 23 as illustrated in FIG. 10. Further, in FIG. 10, an input signal 1003 of the mechanical end oscillation characteristic model 92 is yp/Fp of a second term on a right side of Equation (5) calculated based on Equation (5) in the position command estimator 1001. It is assumed that the motor axis position response is yp, the estimation filter matching the inverse characteristics of the position controller 7 is Fp, and yp/Fp is obtained from the position command estimator 1001 as the signal 1003.

Comparing the configuration of FIG. 9 with that of FIG. 10, FIG. 10 has an advantage that processing can be simplified since it is unnecessary to provide unit converters in various places.

In the configurations of FIGS. 2 and 8, the damping controller in the speed control system processes the speed command 14 to suppress oscillation of the mechanical end. However, it is possible to suppress oscillation of the mechanical end by processing the motor axis position response 15 as illustrated in FIG. 11.

Figure 11:
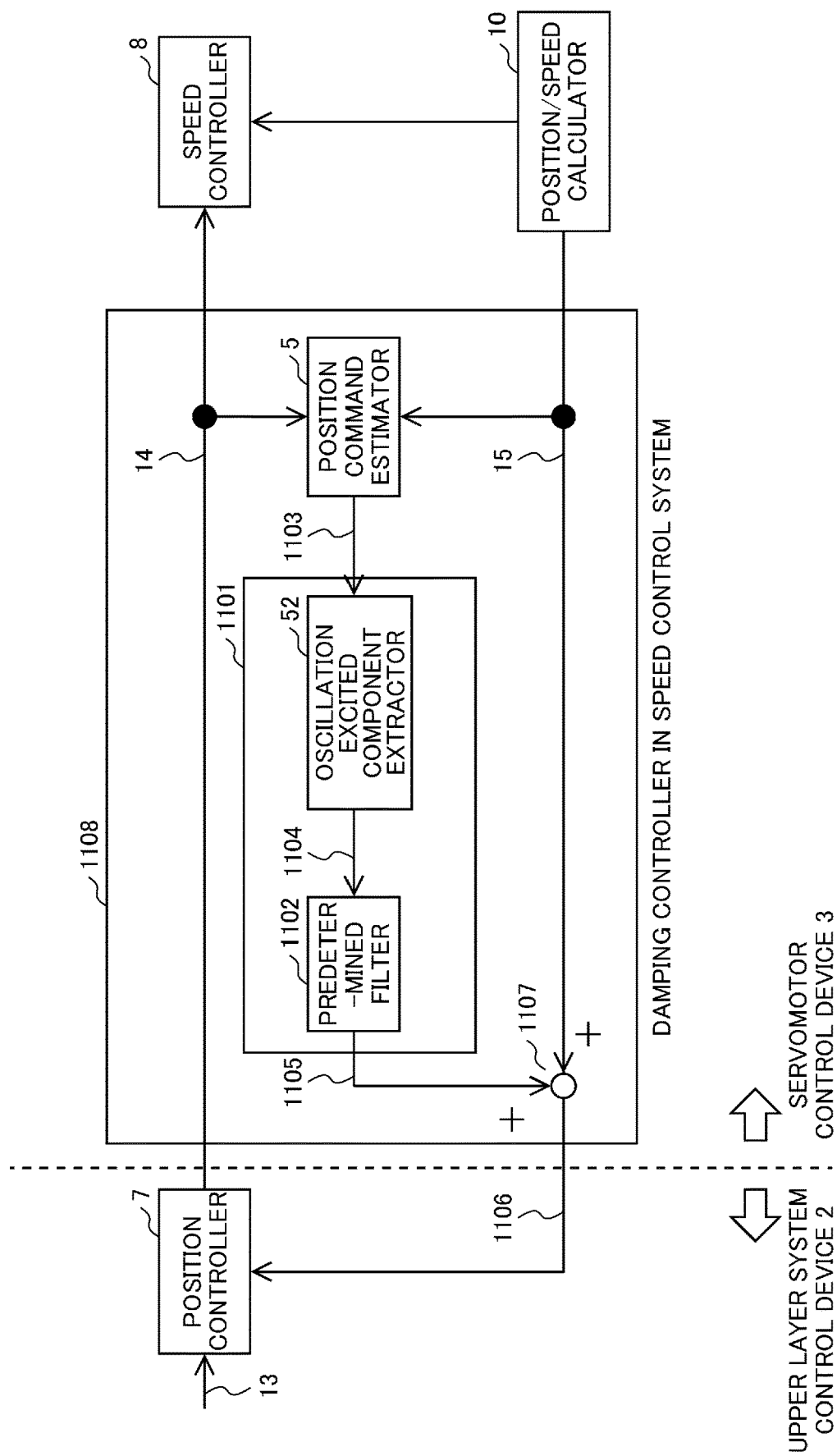
FIG. 11 is a configuration diagram of a parallel type damping control that processes a motor axis position response.

In FIG. 11, a parallel type damping controller 1101 includes an oscillation excited component extractor 52 that extracts a frequency component for exciting oscillation of the end section of the machine included in the speed command 14, and a predetermined filter 1102 that processes extracted frequency component. An output signal 1105 of the parallel type damping controller 1101 is added to the motor axis position response 15 by an adder/subtractor 1107, and an output signal 1106 of the adder/subtractor 1107 is an output of a damping controller 1108 in the speed control system and is output to the upper layer system control device 2 as an actual motor axis position response 1106.

When the oscillation excited component extractor 52 is LE of Equation (1), the predetermined filter 1102 of FIG. 11 may be the following equation.

[Equation 6]

$$\text{Predetermined filter } LE_b = \frac{1}{1-LE} = \frac{2WL\omega_n \cdot s}{s^2 + 2W(1-L)\omega_n \cdot s + \omega_n^2} \quad (6)$$

When the predetermined filter is set to Equation (6), an effect of FF type damping control that removes the frequency component for exciting oscillation of the mechanical end from the position command 13 is obtained via a position FB loop. Therefore, even the damping controller 1108 in the speed control system that processes the motor axis position response 15 illustrated in FIG. 11 may realize damping control that suppresses oscillation of the mechanical end.

Figure 12:
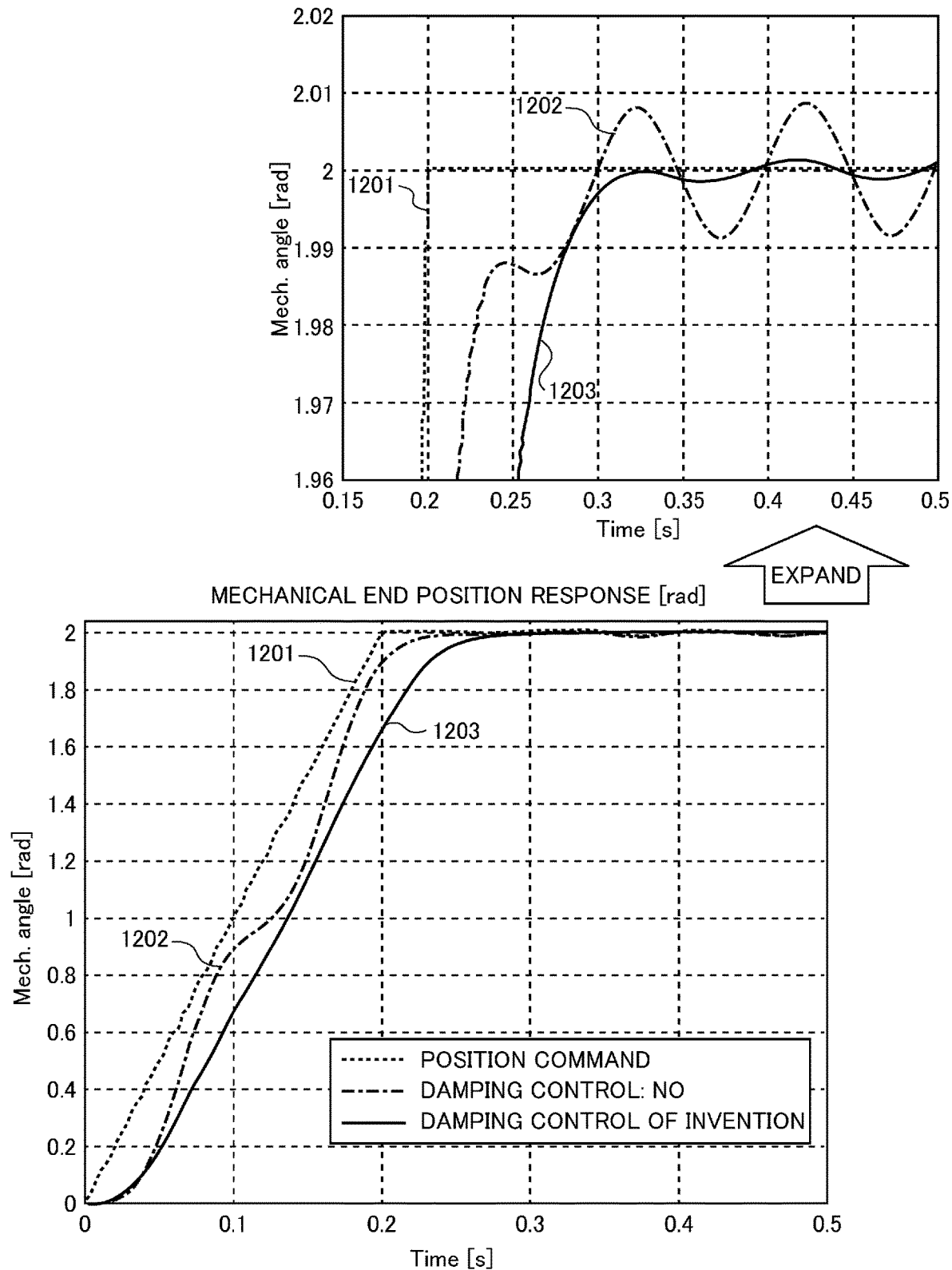
FIG. 12 is a diagram illustrating an effect of damping control in the configuration of FIG. 5.

FIG. 12 illustrates an effect of damping control of the mechanical end in the configuration illustrated in FIG. 5. A vertical axis of FIG. 12 represents a position response (rad) of the mechanical end, and a horizontal axis thereof represents time (s).

A mechanical end position response 1202 when no damping control is applied to the position command 1201 oscillates from a rising edge, and oscillation is remarkable even after 0.2 [sec] for setting.

Meanwhile, in a damping mechanical end position response 1203 in damping control of the present embodiment illustrated in FIG. 5, oscillation of the mechanical end is suppressed from the rising edge, and oscillation may be suppressed even after 0.2 [sec] for setting. Therefore, it can be seen from FIG. 12 that the damping control of the present embodiment is sufficiently effective.

According to the present embodiment, in the motor control system having the semi-closed configuration, the upper layer system control device has the position controller, and it is possible to obtain a motor control device that realizes damping control in the motor servo control device responsible for the speed control system without processing the position command for the purpose of suppression of damping at the mechanical end in the upper layer system control device. As a result, the response of the control system may be enhanced, and the tact time may be improved.

Note that in the present embodiment, it is assumed that the control target machine is the bi-inertial system. However, it is possible to adopt a three-inertial frame or a multi-inertial system, which may be addressed by expanding the parallel type damping control.

Further, the parallel type damping controller may have a configuration in which FF type damping control and FB type damping control are arbitrarily combined, which may be realized by combining the FB type damping control and the FF type damping control based on the parallel type damping controller illustrated in FIGS. 5, 6, and 9.

Second Embodiment

Figure 13:
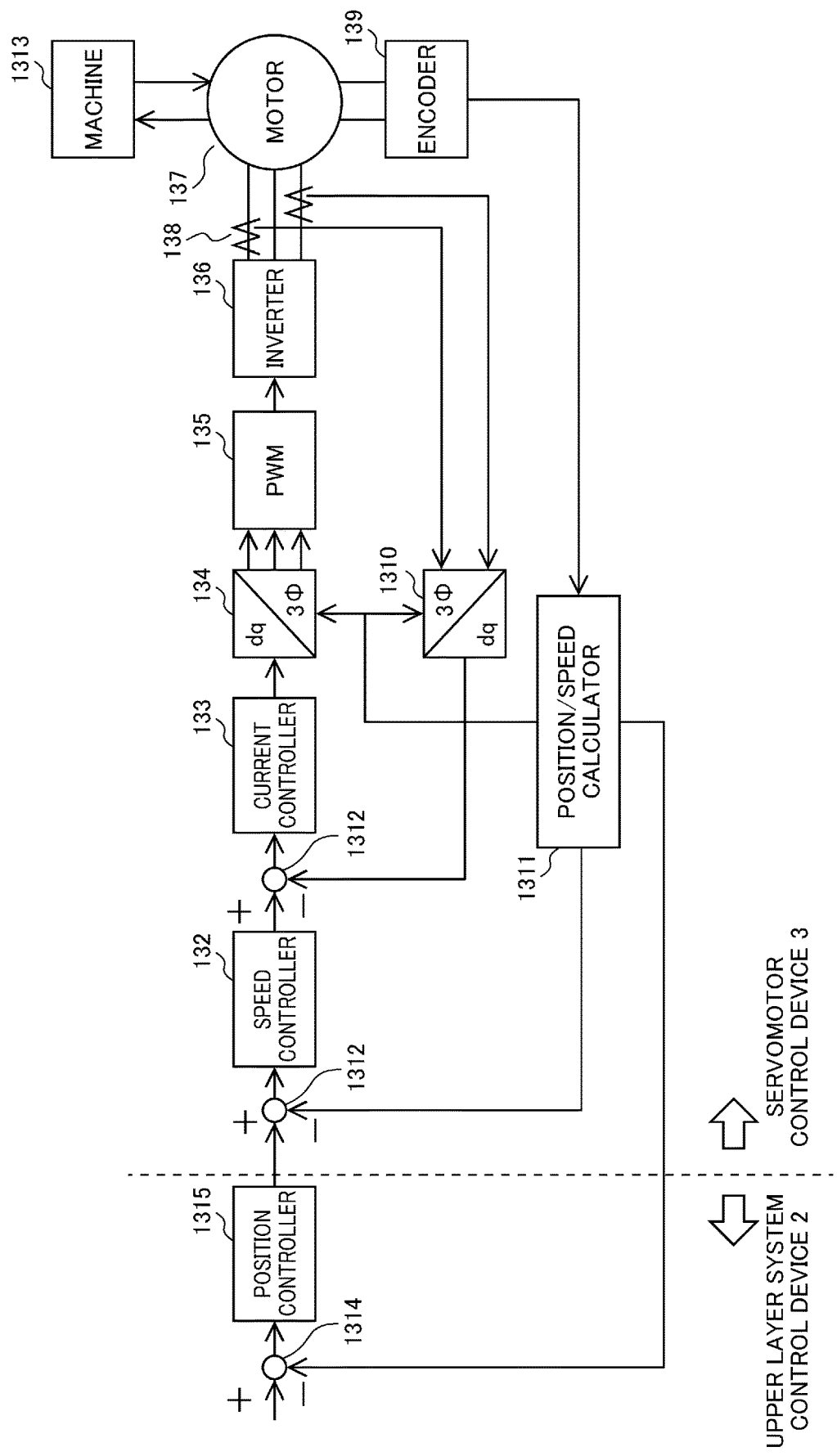
FIG. 13 is a diagram illustrating a general AC servomotor control system.

A motor control device of a second embodiment is the case assuming application to a cascade position FB control system of an AC servomotor including an upper layer system control device 2 and a servomotor control device 3 illustrated in FIG. 13.

Figure 14:
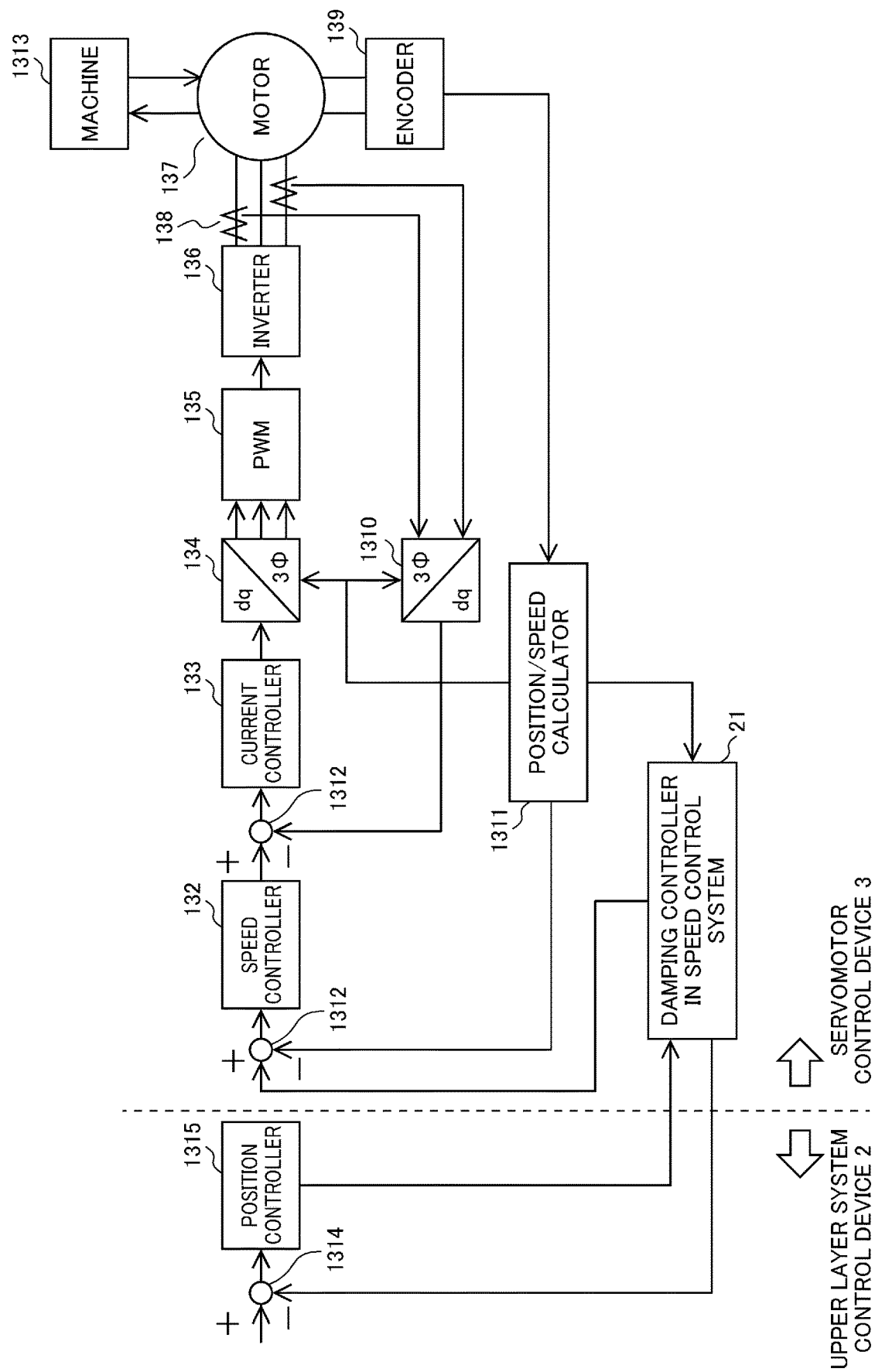
FIG. 14 is a diagram illustrating an AC servomotor control system having a damping controller in a speed control system.

FIG. 14 is the case where the damping controller 21 in the speed control system illustrated in the first embodiment is applied to FIG. 13.

The cascade position FB control system of the AC servomotor of FIG. 14 includes an adder/subtractor 1312, an adder/subtractor 1314, a position controller 1315, a speed controller 132, a current controller 133, a first coordinate converter 134 that converts coordinates from a d-q coordinate system to a 3-phase coordinate system, a second coordinate converter 1310 that converts coordinates from a 3-phase coordinate system to a d-q coordinate system, a PWM output device 135 that inputs a 3-phase voltage command and outputs a PWM pulse, an inverter (power converter) 136 having a switching element, a current detector 138, a position/speed calculator 1311, a damping controller 21 in a speed control system, an encoder 139 that measures the number of revolutions of the motor, a motor 137, and a machine 1313 driven by the motor.

The damping controller 21 in the speed control system inputs a motor axis position response calculated by the position/speed calculator 1311 from an output of the encoder 139 and a position operation amount from the position controller 1315, outputs the motor axis position response to the position controller 1315, and outputs a speed command to the speed controller 132.

Assuming that an electric circuit part of the motor is controlled by the current controller 133 and this control cycle is faster than the speed controller 132, the current control system is approximately regarded as 1 in the speed control system (the operation amount of the speed controller 132 directly reaches a mechanical part (rotor) of the motor 137).

Therefore, the control target of the speed controller 132 is the mechanical part (rotor) of the motor 137 and the machine 1313 coupled to the motor rotor, which corresponds to the control target of the FB controller in FIG. 1.

Further, assuming that the control cycle of the speed controller 132 is faster than the control cycle of the position controller 1315, the speed control system is approximately regarded as 1 in the position control system.

The damping controller 21 in the speed control system is located in a preceding stage of the speed control system, processes the speed command which is an output of the upper layer system control device 2, and generates a command to the speed controller 132.

The number of inertias of the machine 1313 is set to 1, and when the machine 1313 and the motor rotor are elastically coupled, the control target may be regarded as a bi-inertial system in which the machine 1313 and the motor rotor are coupled by a spring damper, and the control target has frequency characteristics including a set of resonance/antiresonance characteristics.

In addition, when the number of inertias of the machine 1313 is 2, each of the inertias is coupled by a spring damper, and one of the inertias is elastically coupled to the motor rotor, the control target may be regarded as a three-inertia system in which each inertia is coupled by a spring damper, and has frequency characteristics including two sets of resonance/antiresonance characteristics.

The machine 1313 has low rigidity and has resonance/antiresonance characteristics in a low frequency range of several Hz to 100 Hz.

First, FIG. 13 in a state where the damping controller 21 in the speed control system is not included is considered. When the control gain of the position controller 1315 is increased, the position command to the motor axis position response of the motor 137 are controlled so that a high response is obtained, and oscillation caused by the resonance/antiresonance characteristics of the machine 1313 is suppressed, since the rigidity of the machine 1313 is low, the end section of the machine 1313 oscillates.

Meanwhile, as illustrated in FIG. 14, when the damping controller 21 in the speed control system is included, the damping effect at the mechanical end may be exhibited as described in the first embodiment, and a sufficient damping effect may be obtained as illustrated in FIG. 12, for example.

Therefore, according to the present embodiment, in the AC servomotor control system having the semi-closed configuration, the upper layer system control device has the position controller, and it is possible to provide a motor control device including a means that realizes damping control in the motor servo control device responsible for the speed control system without processing a position command for the purpose of damping at the mechanical end in the upper layer system control device.

Note that since a cascade control configuration using a speed/position controller is obtained in DC motor control in addition to AC servomotor control, according to the present embodiment, by interposing the damping controller 21 in the speed control system in the preceding stage of the speed controller, damping at the mechanical end may be realized in the speed control system.

In addition to the motor control device, the embodiment is applicable to, for example, a semiconductor inspection device, a main motor control device for an electric vehicle, an electric power steering, etc.

REFERENCE SIGNS LIST

- 2 Upper layer system control device
- 3 Servomotor control device
- 5 Position command estimator
- 10 Position/speed calculator
- 13 Position command
- 14 Speed command
- 15 Motor axis position response
- 21 Damping controller in speed control system
- 23 Parallel type damping controller
- 52 Oscillation excited component extractor

The invention claimed is:

1. A motor control device for receiving a speed command from an upper layer system control device having a position controller, the motor control device comprising:
    a position command estimator that calculates an estimate of a position command based on the speed command and a motor axis position response; and
    a speed command generator that generates an actual speed command based on the estimate, wherein
    the actual speed command prevents an end section of a machine connected to a motor from oscillating, and
    the actual speed command is output from the speed command generator to a speed controller.

2. The motor control device according to claim 1, wherein the speed command generator includes:
    an oscillation frequency component extractor that extracts a frequency component for exciting oscillation of an end section of the machine; and
    a controller that receives a separate position command from a frequency component for exciting oscillation of the end section of the machine, and generates the actual speed command.

3. A motor control device for receiving a speed command from an upper layer system control device having a position controller, the motor control device comprising:
    a position command estimator that calculates an estimate of a position command based on the speed command and a motor axis position response;
    a parallel type damping controller that extracts a frequency component for exciting oscillation of an end section of a machine connected to a motor included in the speed command based on the estimate, and outputs the extracted frequency component; and
    an adder/subtractor that subtracts an output of the parallel type damping controller from the speed command,
    wherein an output of the adder/subtractor is set as an actual speed command and used as a command of a speed controller.

4. The motor control device according to claim 3, wherein the parallel type damping controller calculates a reverse phase component of an oscillation component of the end section based on the estimate and a motor axis position response, and outputs the reverse phase component to the adder/subtractor.

5. The motor control device according to claim 3, wherein the position command estimator includes:
    an estimation filter that inputs the speed command and matches inverse characteristics of the position controller; and
    an adder that adds an output of the estimation filter and the motor axis position response.

6. The motor control device according to claim 3, wherein:
    the parallel type damping controller includes:
    an oscillation-excited component extraction filter that extracts the frequency component for exciting oscillation of an end section of the machine included in the speed command from the estimate without phase lag; and
    a unit converter that converts a unit of the frequency component extracted by the oscillation-excited component extraction filter into a dimension of a speed, and an output of the unit converter is used as an output of the parallel type damping controller.

7. The motor control device according to claim 4, wherein:
the parallel type damping controller includes:
a normative response model that defines that a desired response is obtained without oscillation with respect to the position command;
a mechanical end oscillation characteristic model that means transmission characteristics from a motor axis to a mechanical end;
a third adder/subtractor; and
a unit converter that converts a unit of an input signal into a dimension of a speed,
a signal obtained by processing the motor axis position response using the mechanical end oscillation characteristic model is removed from a signal obtained by processing an output of the position command estimator using the normative response model by the third adder/subtractor, and
a signal obtained by processing an output signal of the third adder/subtractor using the unit converter is set as the reverse phase component of the oscillation component of the end section and used as an output of the parallel type damping controller.

8. The motor control device according to claim 3, wherein the position command estimator:
uses a signal obtained by mapping the position command using a predetermined filter as an estimation target; and
outputs the estimate of the signal obtained by mapping the position command using the predetermined filter.

9. The motor control device according to claim 3, wherein:
the parallel type damping controller:
outputs an extraction signal that extracts the frequency component for exciting oscillation of a mechanical end included in the speed command;
includes a fourth adder/subtractor, the scalar adjustment gain, and a differentiator;
subtracts the extraction signal from the estimate of the position command using the fourth adder/subtractor; and
outputs a feedforward control signal obtained by processing an output signal of the fourth adder/subtractor using the adjustment gain and the differentiator, and
the feedforward control signal is added to the speed command using a fifth adder/subtractor, the extraction signal is removed from the speed command using the fifth adder/subtractor, and an output of the fifth adder/subtractor is used as the actual speed command.

10. The motor control device according to claim 3, wherein:
the parallel type damping controller includes:
an oscillation excited component extractor that extracts the frequency component for exciting oscillation of an end section of the machine included in the speed command;
a normative response model that defines that a desired response is obtained without oscillation with respect to the position command;
a mechanical end oscillation characteristic model that means transmission characteristics from a motor axis to the mechanical end;
a third adder/subtractor; and
a unit converter that converts a unit of an input signal into a dimension of a speed,
a signal obtained by processing the motor axis position response using the mechanical end oscillation characteristic model is removed from a signal obtained by processing an output of the position command estimator using the normative response model by the third adder/subtractor,
a signal obtained by processing an output signal of the third adder/subtractor using the unit converter is output as a reverse phase component of an oscillation component of the end section, and
a signal extracting the frequency component for exciting oscillation of the end section included in the speed command is removed by a sixth adder/subtractor, the reverse phase component is removed from the speed command by the sixth adder/subtractor, and an output of the sixth adder/subtractor is used as the actual speed command.

11. The motor control device according to claim 8, wherein:
the position command estimator includes:
the predetermined filter; and
an adder,
a signal obtained by processing the motor axis position response using the predetermined filter and the speed command are added by the adder,
an output signal of the adder is used as an output of the position command estimator,
the parallel type damping controller extracts the frequency component for exciting oscillation of an end section of the machine from an output of the position command estimator and uses the frequency component as an output signal.

12. A motor control device for receiving a speed command from an upper layer system control device having a position controller, the motor control device comprising:
a position command estimator that calculates an estimate of a position command based on the speed command and a motor axis position response from a motor;
a parallel type damping controller that extracts a frequency component for exciting oscillation of an end section of a machine included in the speed command based on an estimate of the position command, and outputs a signal obtained by processing the extracted frequency component using a predetermined filter; and
an adder, wherein:
the motor axis position response and an output of the parallel type damping controller are added by the adder; and
an output signal of the adder is used as an actual motor axis position response, and the actual motor axis position response is output to the position controller.

* * * * *